(12) United States Patent
Gifford et al.

(10) Patent No.: US 7,355,811 B1
(45) Date of Patent: Apr. 8, 2008

(54) HERMETICALLY SEALED HOUSING WITH INTERIOR CAPTURE PLATE

(75) Inventors: Bruce Gifford, Nashua, NH (US); Thomas G. Andrikowich, Whitinsville, MA (US); Michael C. Strzepa, Shrewsbury, MA (US); Richard O'Day, Westborough, MA (US)

(73) Assignee: Maxtor Corporation, Scotts Valley, CA (US)

( * ) Notice: Subject to any disclaimer, the term of this patent is extended or adjusted under 35 U.S.C. 154(b) by 426 days.

(21) Appl. No.: 10/839,611

(22) Filed: May 4, 2004

(51) Int. Cl.
*G11B 33/14* (2006.01)
*G11B 23/03* (2006.01)

(52) U.S. Cl. .............. 360/97.02; 360/97.01; 360/133

(58) Field of Classification Search ............. 360/97.01, 360/97.02
See application file for complete search history.

(56) References Cited

U.S. PATENT DOCUMENTS

| | | | | |
|---|---|---|---|---|
| 4,367,503 A * | 1/1983 | Treseder | .................. | 360/97.03 |
| 4,491,888 A | 1/1985 | Brown et al. | | |
| 4,556,969 A * | 12/1985 | Treseder et al. | ............. | 720/736 |
| 5,150,267 A * | 9/1992 | Reinisch | .................. | 360/97.02 |
| 5,223,996 A * | 6/1993 | Read et al. | ............... | 360/97.02 |
| 5,272,580 A * | 12/1993 | Hickox et al. | ............ | 360/97.02 |
| 5,282,100 A | 1/1994 | Tacklind et al. | .......... | 360/97.02 |
| 5,282,101 A * | 1/1994 | Reinisch | .................. | 360/97.03 |
| 5,293,282 A * | 3/1994 | Squires et al. | ............ | 360/77.08 |
| 5,422,766 A * | 6/1995 | Hack et al. | ............... | 360/97.02 |
| 5,454,157 A | 10/1995 | Ananth et al. | ................. | 29/603 |
| 5,666,243 A | 9/1997 | Brent | ......................... | 360/106 |
| 5,784,296 A | 7/1998 | Baker et al. | ........... | 364/551.01 |
| 6,144,178 A | 11/2000 | Hirono et al. | | |
| 6,178,059 B1 | 1/2001 | Frees | .......................... | 360/75 |
| 6,222,375 B1 | 4/2001 | Fitzpatrick et al. | ......... | 324/601 |
| 6,317,286 B1 | 11/2001 | Murphy et al. | | |
| 6,373,654 B1 | 4/2002 | Iwahara et al. | | |
| 6,392,838 B1 | 5/2002 | Hearn et al. | ............. | 360/97.02 |

(Continued)

FOREIGN PATENT DOCUMENTS

JP 62-71078 A 4/1987

(Continued)

OTHER PUBLICATIONS

U.S. Appl. No. 10/055,237, filed Oct. 24, 2001, Marshall et al.

(Continued)

*Primary Examiner*—Angel Castro
*Assistant Examiner*—Christopher R. Magee
(74) *Attorney, Agent, or Firm*—Fellers, Snider, et al.

(57) ABSTRACT

A method and apparatus for aligning and securing a spindle shaft and actuator shaft in a low-density gas-filled hard disk drive and independent of the disk drive cover is provided. A capture plate is positioned above the memory disk(s) and is secured to the base plate. The spindle shaft and, optionally, the actuator shaft are secured between the base plate and capture plate. The capture plate may be configured to reduce vibration. This structure eliminates use of the cover to secure the spindle shaft and actuator shaft and, thereby, eliminates a potential pathway for low-density gas to escape. The capture plate may also be configured to reduce air turbulence created by the rotating disk and reduce track misregistration of the read/write element(s).

37 Claims, 7 Drawing Sheets

U.S. PATENT DOCUMENTS

| | | | |
|---|---|---|---|
| 6,496,362 | B2 | 12/2002 | Osterhout et al. |
| 6,567,235 | B2 | 5/2003 | Kasetty et al. ........... 360/97.01 |
| 6,618,221 | B2 | 9/2003 | Gillis et al. |
| 6,631,053 | B1 | 10/2003 | Chew ...................... 360/265.7 |
| 6,644,362 | B2 | 11/2003 | Bernett |
| 6,646,821 | B2 | 11/2003 | Bernett |
| 6,678,102 | B1 | 1/2004 | Liikanen et al. .............. 360/31 |
| 6,683,747 | B2 | 1/2004 | Bernett |
| 6,762,909 | B2 | 7/2004 | Albrecht et al. |
| 6,785,082 | B2 | 8/2004 | Fiorvanti et al. |
| 6,785,089 | B2 | 8/2004 | Bernett |
| 6,831,811 | B1* | 12/2004 | Andrikowich et al. ... 360/97.02 |
| 6,876,515 | B2 | 4/2005 | Unno |
| 6,898,043 | B2 | 5/2005 | Fioravanti |
| 6,914,742 | B1 | 7/2005 | Fioravanti et al. |
| 6,930,858 | B2 | 8/2005 | Gunderson et al. |
| 6,970,322 | B2 | 11/2005 | Bernett |
| 6,989,493 | B2 | 1/2006 | Hipwell, Jr. et al. |
| 6,999,262 | B2 | 2/2006 | Han et al. |
| 7,000,309 | B1* | 2/2006 | Klassen et al. .......... 29/603.03 |
| 7,016,145 | B2* | 3/2006 | Gunderson et al. ...... 360/97.02 |
| 7,062,387 | B1* | 6/2006 | Burns et al. .................. 702/51 |
| 2003/0007280 | A1 | 1/2003 | Bernett et al. ........... 360/77.02 |
| 2003/0026033 | A1 | 2/2003 | Floravanti et al. ............. 360/75 |
| 2003/0081349 | A1 | 5/2003 | Bernett .................... 360/97.02 |
| 2003/0089417 | A1 | 5/2003 | Bernett ........................ 141/65 |
| 2003/0090832 | A1 | 5/2003 | Bernett et al. ........... 360/97.02 |
| 2003/0172520 | A1 | 9/2003 | Liu et al. |
| 2003/0179489 | A1 | 9/2003 | Bernett et al. ........... 360/97.01 |
| 2003/0202276 | A1 | 10/2003 | Smith ..................... 360/97.02 |
| 2004/0216514 | A1 | 11/2004 | Nunnally et al. |
| 2005/0068666 | A1 | 3/2005 | Albrecht et al. |
| 2005/0173870 | A1 | 8/2005 | Gunderson |
| 2005/0184463 | A1 | 8/2005 | Boutaghou et al. |
| 2006/0002067 | A1 | 1/2006 | Gunderson et al. |
| 2006/0044666 | A1 | 3/2006 | Fukushima |
| 2006/0044675 | A1 | 3/2006 | Fukushima et al. |
| 2006/0072241 | A1 | 4/2006 | Feliss et al. |
| 2006/0072244 | A1 | 4/2006 | Rapp |

FOREIGN PATENT DOCUMENTS

| | | | |
|---|---|---|---|
| WO | WO 2004/010419 A1 | 1/2004 | |
| WO | WO 2004/010431 A1 | 1/2004 | |

OTHER PUBLICATIONS

U.S. Appl. No. 10/266,436, filed Oct. 8, 2002.
U.S. Appl. No. 10/839,608, filed May 4, 2004, deJesus et al.
U.S. Appl. No. 10/848,476, filed May 17, 2004, Burns et al.
U.S. Appl. No. 10/839,548, filed May 4, 2004, Andrikowich et al.
U.S. Appl. No. 10/839,606, filed May 4, 2004, Andrikowich et al.
U.S. Appl. No. 10/839,685, filed May 4, 2004, Andrikowich et al.
U.S. Appl. No. 10/860,626, filed Jun. 2, 2004, Mann et al.
IBM Corp., "Seal for a Hermetically Sealed Disk File," IBM Technical Disclosure Bulletin, vol. 27, No. 11 (Apr. 1985).

* cited by examiner

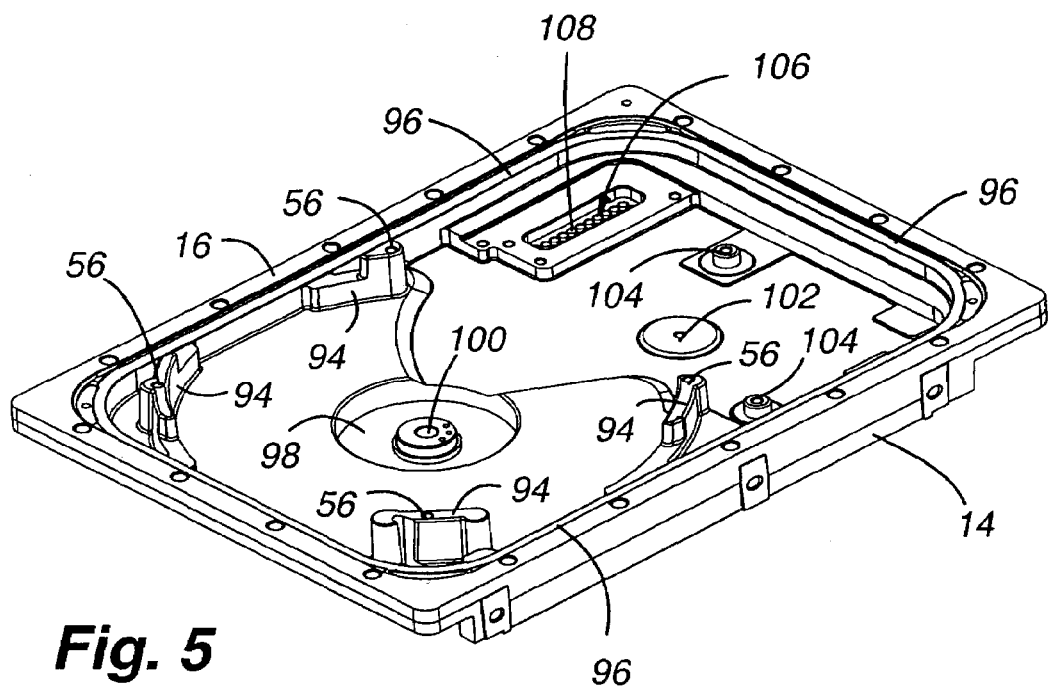
Fig. 5
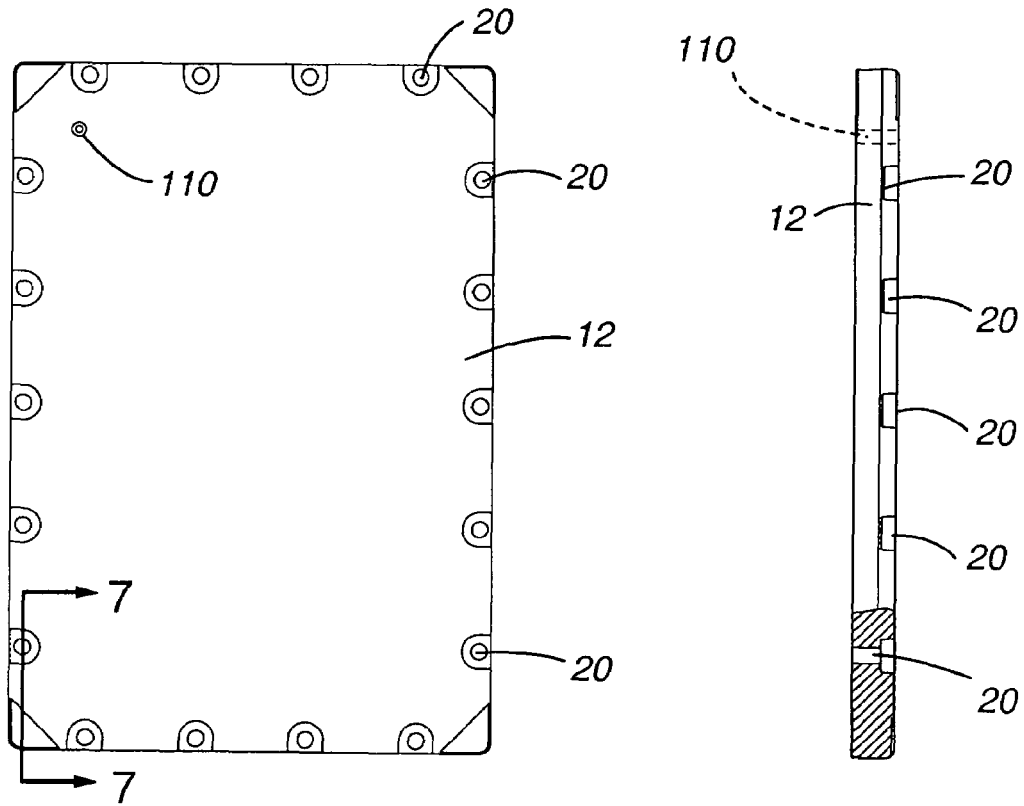
Fig. 6
Fig. 7

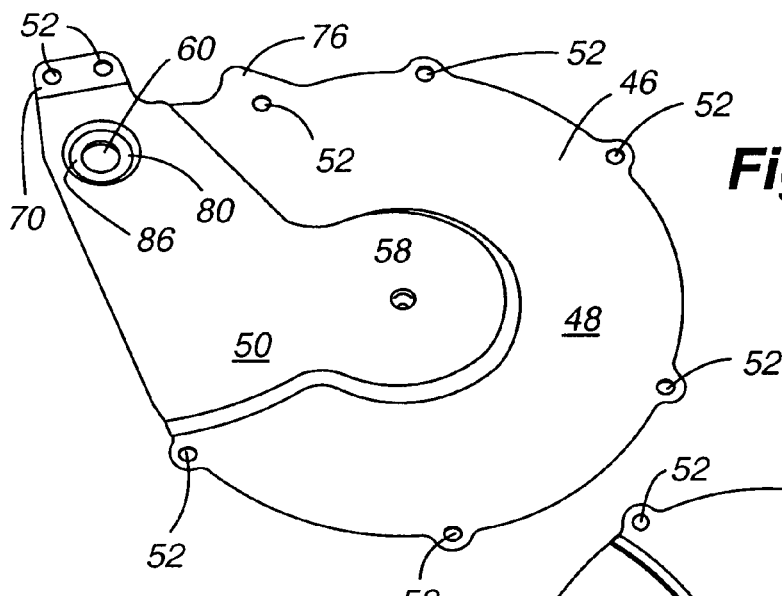
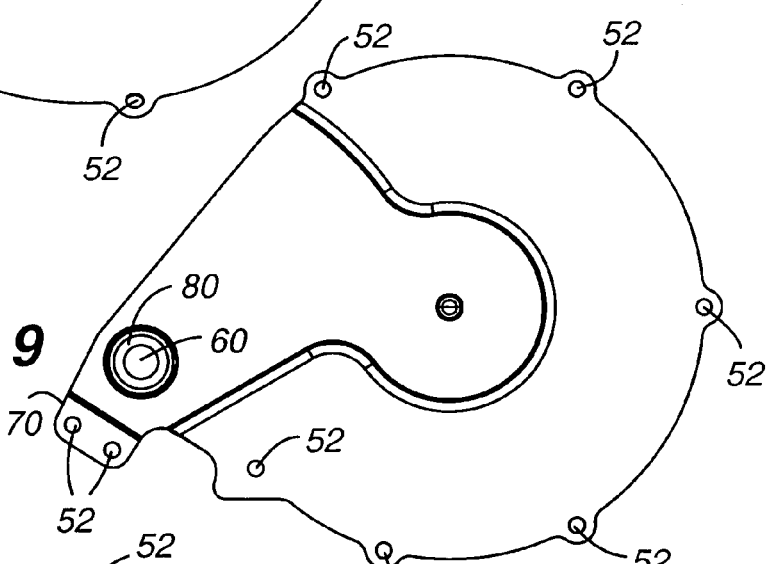
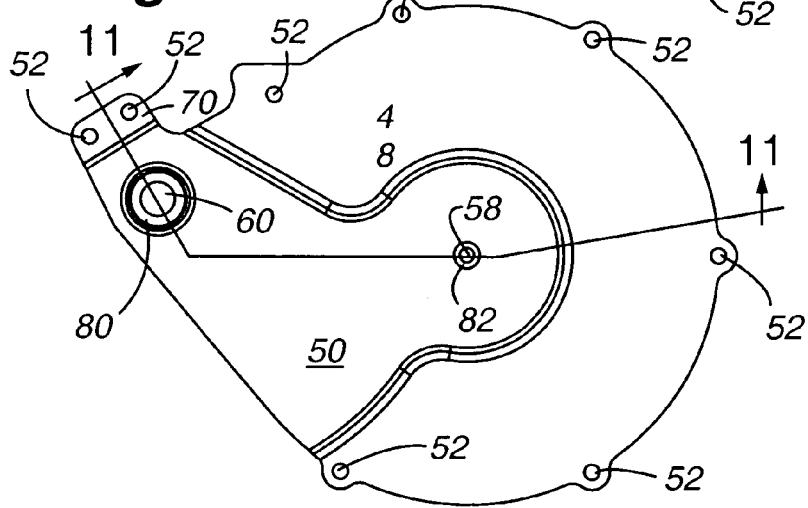
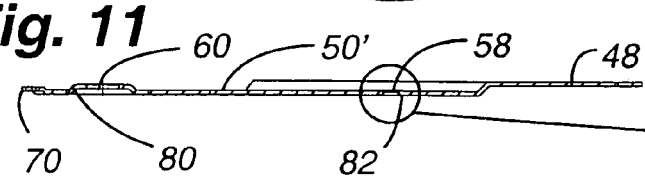
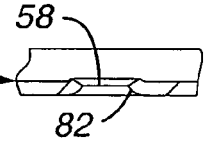

HERMETICALLY SEALED HOUSING WITH INTERIOR CAPTURE PLATE

FIELD OF THE INVENTION

The present invention relates to hard disk drives filled with low-density gas. More particularly, the present invention relates to a system of aligning and securing the spindle motor shaft and actuator shaft without using the cover of the disk drive assembly and other techniques to maintain an appropriate volume of low-density gas within the disk drive assembly over an acceptable time period.

BACKGROUND OF THE INVENTION

Hard disk drives incorporate magnetic storage disks and read/write heads which are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly which positions the heads relative to the surface of the storage disks. This may be at a predetermined height above the corresponding storage disk or, in some instances, in contact with the surface of the storage disk. The actuator assembly is typically positioned by a voice coil motor which acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely effected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals or gaskets used in disk drives between the housing components, such as between the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low density gas or a lower density gas means a gas having a density less than that of air. When compared with air, lower density gases can reduce aerodynamic drag experienced by spinning disks within the drive, thereby reducing power requirements for the spindle motor. A low density gas-filled drive thus uses less power than a comparable disk drive that operates in an air environment. Relatedly, the reduction in drag forces within the low density gas-filled drive reduces the amount of aerodynamic turbulence that is experienced by drive components such as the actuator arms, suspensions and read/write heads. Some low density gases also have greater thermal conductivity, which results in better motor efficiencies and therefore lower power consumption for a given performance level. Reduction in turbulence allows drives filled with low density gas to operate at higher speeds compared with air-filled drives, while maintaining the same flying height and thereby maintaining the same range of read/write errors. Low density gas-filled drives also allow for higher storage capacities through higher recording densities due to the fact that there is less turbulence within the drive which allows tracks to be spaced more closely together.

Despite these advantages, low density gas-filled drives have not been commercially successful. Low density gas-filled drives, in order to function, must be effectively sealed over an acceptable lifetime of the drive. It has been difficult to prevent the low density gas from escaping from the sealed drive environment. Unlike air-filled drives, a port may not be used to equalize pressure outside and inside the drive. As a result, the seal between the cover and base plate, as well as the seals for all openings in the cover and base plate, must minimize or prevent leakage and maintain a threshold level of low density gas within the sealed environment over the expected lifetime of the drive. Conventional rubber or paper seals or gaskets used in air-filled drives are inadequate at preventing leakage of low density gas due to the smaller atom size of low density gases, such as helium, compared to air. The smaller helium atoms diffuse through the rubber or paper seals, thereby reducing the volume of low density gas within the drive. Thus, over time, the necessary threshold quantity of low density gas may be lost within the drive-environment and may or may not be replaced with ambient air. In either case, the performance of the drive will change from the design specifications, namely, a low density gas-filled sealed environment. As the low density gas leaks out of a drive and is replaced by air, the drive is subject to undesirable operational effects possibly leading to unacceptable error rates and/or failure of the drive. For example, the increased concentration of air may increase the turbulent forces on the heads due to the increased drag forces within the drive which may further cause the heads to fly at too great a distance above the disks and potentially increasing instances of read/write errors. If the low density gas leaks from the sealed environment over time and is not replaced by ambient air, problems will occur such as the heads flying at a distance too close or in contact with the disks, thereby increasing instances of read/write errors as well as damage to the disk surface and head and higher operating temperatures due to a reduction in conduction cooling. Each creates a reliability risk. The risk of unanticipated failures due to inadequate amounts of low density gas within the drive is a draw back to low density gas-filled drives. Indeed, data stored within the drive may be irretrievably lost if the drive fails due to the loss of the low density gas environment.

Low density gas-filled drives also must be designed to permit testing and rework, if necessary. Thus, the ability to seal openings in the base plate and/or cover plate on a temporary basis and on a long-term basis must exist. Such openings include, but are not limited to, openings for securing ends of the spindle and actuator shafts to the cover or base plate, or openings to permit servo-writing. One example of such temporary and permanent sealing system is disclosed in co-pending application Ser. No. 10/839,685 entitled "Seal-Type Label to Contain Pressurized Gas Environment", which is incorporated herein, in its entirety. Alternatively, it is desirable to eliminate these openings in the disk drive assembly without compromising the operation of the disk drive. By reducing the number of or eliminating openings in a disk drive assembly, the number of pathways for possible loss of the pressurized low-density gas maintained inside the disk drive is reduced. It is also desirable to seal openings through which electrical connections are made between components inside the disk drive housing and components outside the disk drive housing. One example of such a sealing system is disclosed in co-pending application Ser. No. 10/839,606 entitled "Method for Controlled Fabrication of Hermetically Sealed PCB Connector", which is incorporated herein in its entirety.

SUMMARY OF THE INVENTION

The present invention is generally directed to a system for eliminating openings in the cover and/or base plate of a hard disk drive assembly to thereby reduce the available pathways for leakage of low density gas within the disk drive assembly. In one embodiment, the spindle motor shaft is secured between an independent capture plate and the base plate. The capture plate is separate from the cover and is secured to the base plate at a position inside the cover perimeter. The presence of the capture plate eliminates the need for forming openings in the cover for purposes of securing the spindle shaft. In a second embodiment, the capture plate may extend to and engage the actuator shaft, thereby eliminating a second opening in the cover. Each embodiment provides improved structural rigidity, assists with proper alignment of the spindle shaft and actuator shaft alone and/or relative to each other, and reduces head migration (TMR) and disruptions due to mechanical shocks. The capture plate further allows alignment of the spindle shaft and actuator shaft independent of the cover. In addition, the capture plate may be configured to enclose a substantial portion or all of the upper area of the disk stack and thereby lower air turbulence and enhance disk drive performance. Air turbulence can be further reduced and performance improved by shrouding the perimeter edge of the disk stack. In one embodiment, this can be accomplished by configuring the interior of the base plate to approximate the perimeter shape of the disk stack forming a wall closely adjacent the edge of the disk or disks forming the disk stack.

In other embodiments, the capture plate may take on various alternative configurations. To provide enhanced stiffness and enhanced damping, the capture plate may have planar portions formed at different planes relative to each other. In addition, a layer of damping material may be adhered to one or more surfaces of the capture plate to provide further damping characteristics. The capture plate also may be constructed as a laminate made from two or more layers of metal or other materials such as acrylic-based pressure-sensitive adhesives.

BRIEF DESCRIPTION OF THE DRAWINGS

FIG. 5 is a perspective view of a second embodiment of a base plate.

FIG. 6 is a top plan view of the cover illustrated in FIG. 1.

FIG. 7 is a side plan and partial cross-section view taken along line 7-7 of FIG. 6.

FIG. 8 is a perspective view of one embodiment of a capture plate.

FIG. 9 is a top plan view of the capture plate illustrated in FIG. 8.

FIG. 10 is a bottom plan view of the capture plate illustrated in FIG. 8.

FIG. 11 is a cross-section view of the capture plate of FIG. 8, taken along line 11-11 of FIG. 10.

FIG. 12 is an enlarged partial cross-section view of the recessed opening for securement of the capture plate to a spindle shaft of the embodiment illustrated in FIG. 11.

DETAILED DESCRIPTION

Figure 1:
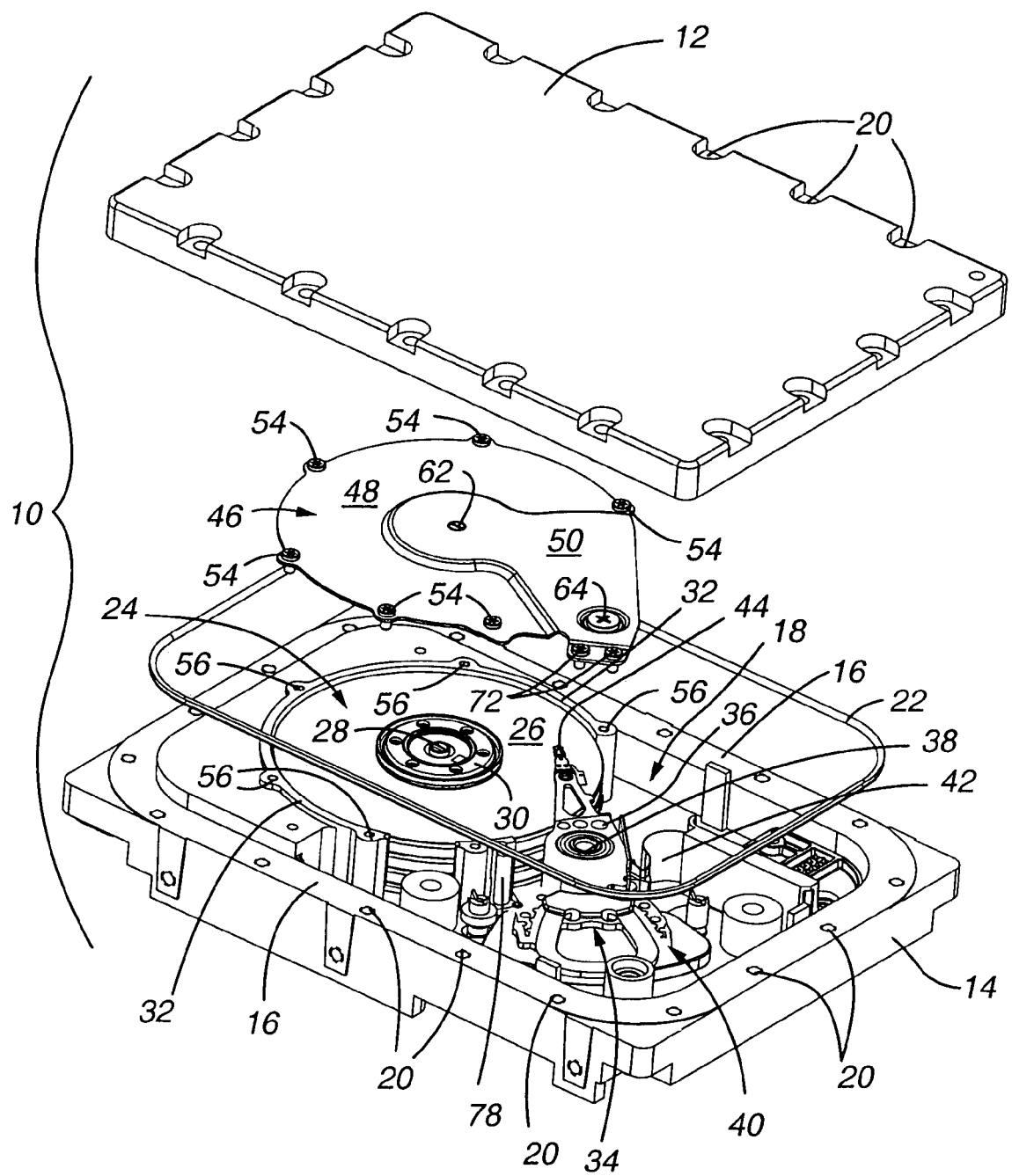
FIG. 1 is an exploded perspective view of one embodiment of the present invention.

Turning to FIG. 1, an exploded perspective view of a disk drive of the present invention is shown. The disk drive assembly 10 generally comprises a cover 12 and base plate 14. The base plate has perimeter walls 16 which define an inner chamber 18. When the cover plate is secured to the base plate, the inner chamber is filled with a low density gas such as helium to create a pressurized low density gas environment for operation of the disk drive components. The cover plate and base plate are provided with aligned apertures 20 equally spaced around the perimeter of each for securing the cover to the base plate. The apertures within the base plate are typically threaded to receive fasteners (not shown). Additionally, it has been determined that a metal C-shaped seal 22 is more suitably adapted to maintaining the pressurized low density gas environment within the chamber 18 than a conventional rubber seal. In the preferred embodiment, the cover and base plate are secured by the fasteners with a force of 400 pounds per circumferential inch in order to maintain a seal over the intended lifetime of the disk drive.

In general terms, a disk drive contains a disk stack 24 comprising one or more circular hard disks 26. The disk stack is mounted to and rotate about a spindle shaft 28. A disk clamp 30 secures the disk stack to the hub (not shown). In the embodiment shown in FIG. 1, the base plate further includes an interior wall 32 which is configured to closely match the perimeter edges of the hard disks to enshroud a substantial circumferential portion of the disks. This interior wall reduces air turbulence caused by the spinning of the disks during operation of the disk drives and helps reduce track misregistration.

The disk drive also generally includes an actuator assembly 34. The actuator assembly comprises an actuator arm or E block 36. The actuator arm is mounted on an actuator shaft 38. The actuator arm rotates about the shaft under the direction of a voice coil motor 40. A flex circuit 42 carries signals between read/write elements 44 positioned at the end of the actuator arm and processors associated with the disk drive positioned on a printed circuit board (not shown) mounted underneath the base plate.

A capture plate 46 is shown, in one embodiment, in FIGS. 1, 2 and 8-11. The capture plate comprises a first planar portion 48 and a second raised planar portion 50 which are shaped or configured to cover the top area of the disk stack. The perimeter edge of the first planar portion includes a plurality of apertures 52 which receive fasteners 54 to secure the perimeter edge to threaded openings 56 in the upper surface of the interior wall 32 which adds structural rigidity to the capture plate. The second raised portion 50 is provided with two apertures 58, 60 configured to receive fasteners 62, 64, respectively, to secure the upper ends of the spindle motor shaft 28 and the actuator shaft 38. Proper alignment of apertures 58, 60 assists in alignment of the spindle shaft relative to the actuator shaft which, in turn, assists in proper registration of the read/write element 44 relative to the data tracks on the surfaces of the disks. Alignment is further achieved independent of the cover.

In the embodiment shown in FIGS. 1, 2 and 8-11, the capture plate is also provided with a ledge 70 to secure the capture plate to the upper voice coil plate 72 via two fasteners 74 positioned in additional securement apertures 52. The ledge portion 70 facilitates reducing and damping vibration induced into the capture plate during operation of the disk drive. As also shown in FIG. 8, in one embodiment, the first planar portion 48 may be provided with a lateral extension or protrusion 76 to provide stability to an actuator latch pin 78. The protrusion 76 extends laterally away from the perimeter of the capture plate to abut against the latch pin 78 secured to the base plate as shown in FIG. 1.

Figure 3:
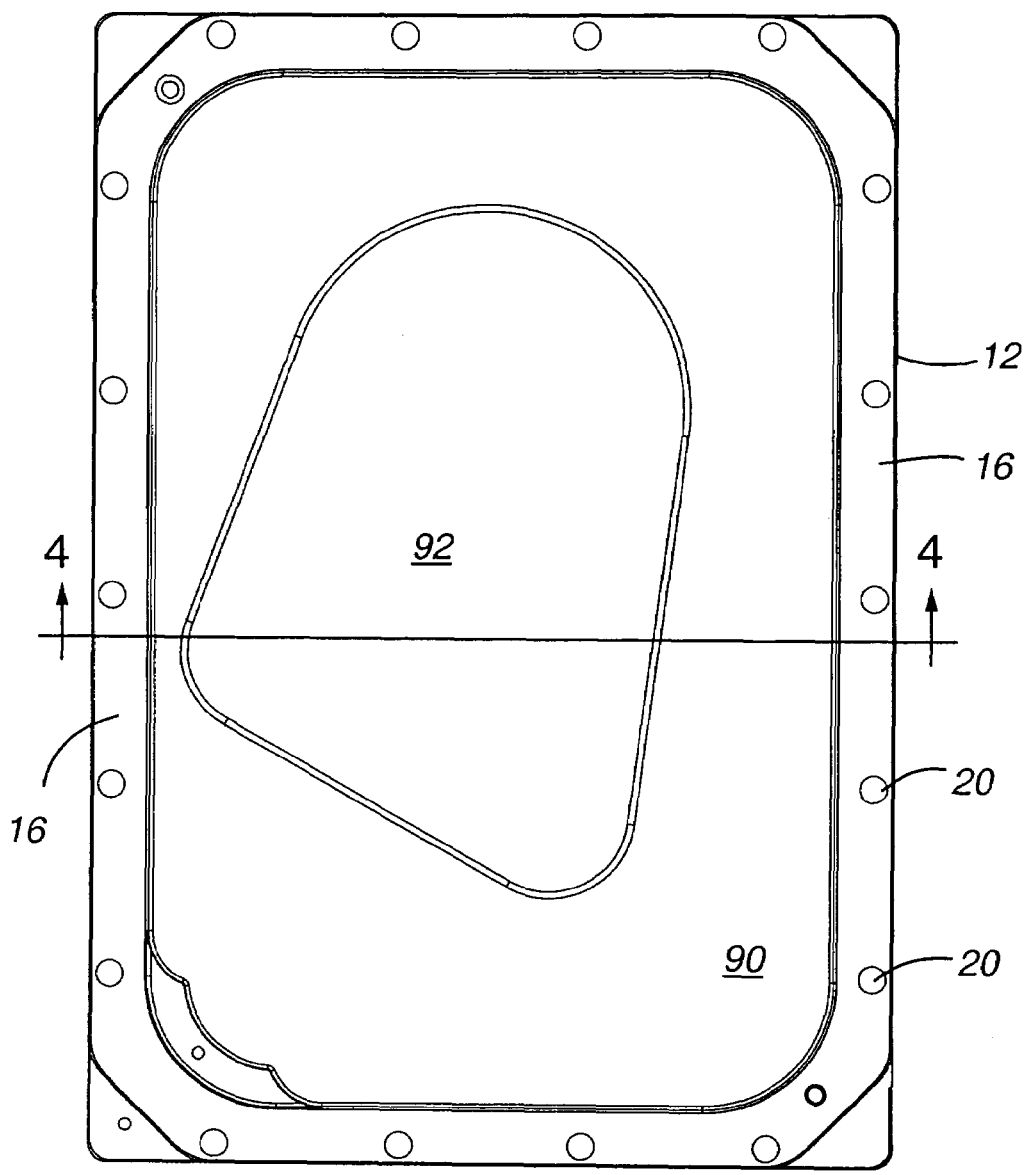
FIG. 3 is a plan view of the inside of the cover illustrated in FIG. 1.
Figure 4:
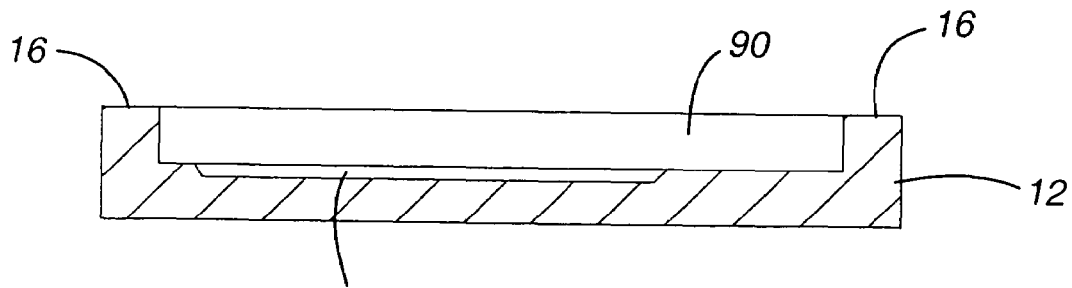
FIG. 4 is a cross-section view taken along line 4-4 of FIG. 3.

From FIG. 8 it is appreciated that the aperture 60 is provided with a counter bore 80 to accommodate the head of the securement fastener 64 to secure the upper end of the actuator shaft. As also shown in FIGS. 11 and 12, the aperture 58 is similarly provided with a counter bore 82 to accommodate the fastener 62 for the spindle shaft 28. As shown in FIGS. 3 and 4, the inside of the cover 12 has a first recess 90 designed to accommodate the structures within the inner chamber 18 of the base plate 14 and a second, deeper recess 92 configured to accommodate the second raised portion of the capture plate. The recesses or counter bores 80, 82 reduce the overall height added to the assembled components by the capture plate and minimizes the depth of the recess 92 in the cover.

Figure 2:
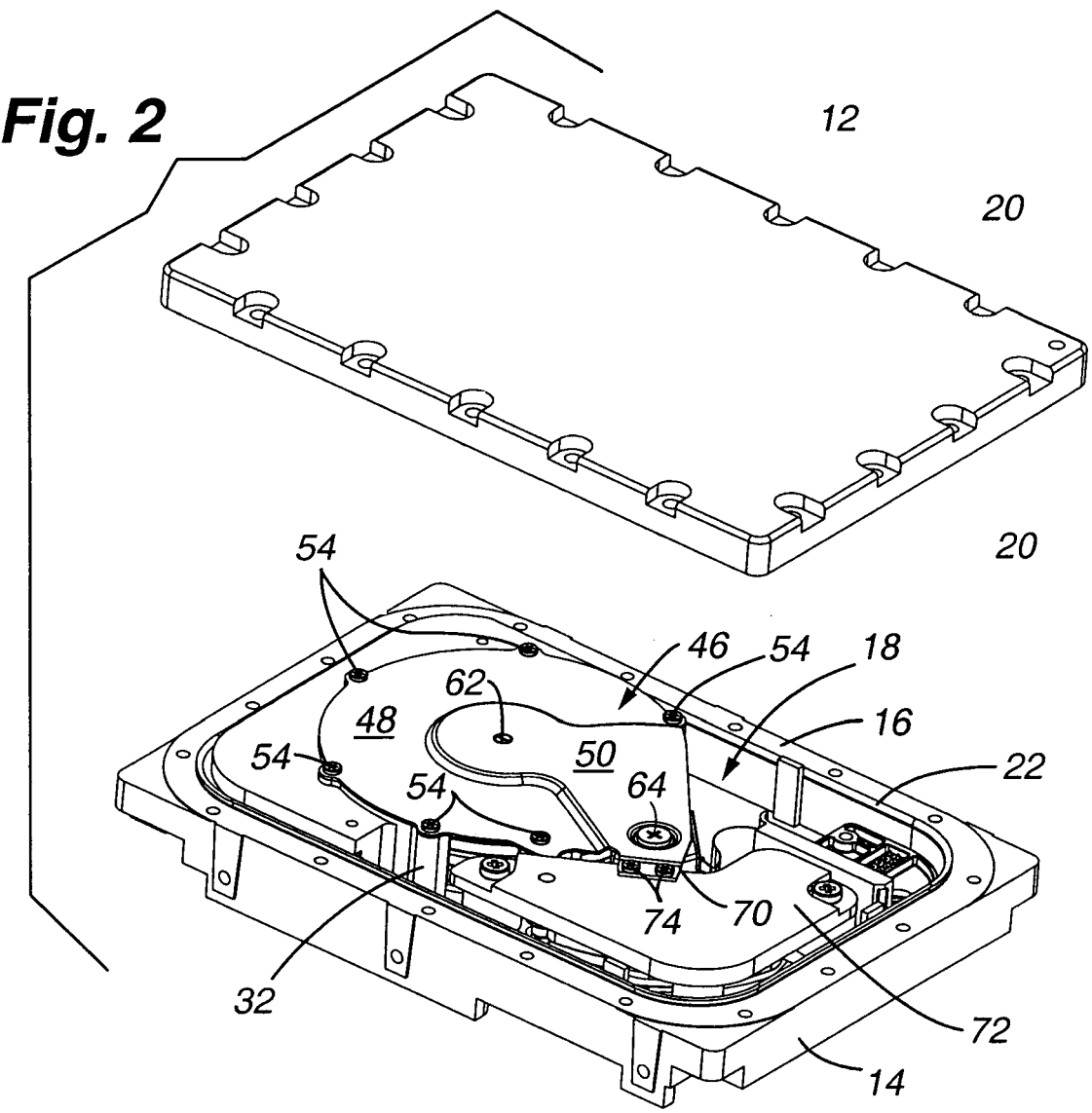
FIG. 2 is an exploded perspective view of the disk drive of FIG. 1, but illustrating the capture plate secured to the base plate and upper voice coil plate.

With reference to FIG. 5, a second embodiment of a base plate 14 is shown. In this embodiment, four partial interior walls 94 are formed on the base plate to reduce air turbulence and to provide threaded apertures 56 for purposes of securing the capture plate 46. Here, the partial interior walls 94 do not fully shroud the perimeter edge of the disk stack to the extent shown in FIGS. 1 and 2. Alternatively, the walls 94 may be configured in a variety of shapes and sizes to fully enclose the perimeter of the disk stack, as shown in FIGS. 1 and 2, partially enclose the disk stack as shown in FIG. 5, or something in between for purposes of reducing turbulence. As further shown, the walls 16 of the base plate are provided with a step or ridge 96 to accommodate the C-seal 22. The base plate further comprises a cylindrical recess 98 to accommodate the spindle motor and hub (not shown) for securing and rotating the disk stack 24. A mounting bushing 100 secures one end of the spindle shaft 28 to the base plate. A second bushing 102 secures one end of the actuator shaft to the base plate. Bushings 104 are also used to secure the upper and lower voice coil motor plates (not shown). A recess 106 having an array of apertures 108 is configured to receive a multi-pin input/output connector (not shown) for interconnecting a printed circuit board containing numerous electronic components disposed on the opposite surface of the base plate to the flex circuit. A method and apparatus for hermetically sealing the apertures 108 is disclosed in co-pending application Ser. No. 10/839,606 entitled "Method for Controlled Fabrication of Hermetically Sealed PCB Connector".

With the cover 12 in secured place on the base plate, the interior chamber 18 is filled with a low-density gas, such as helium, through port 110. FIGS. 6 and 7 illustrate port 110. One method and apparatus used to fill the disk drive with a low-density gas is disclosed in co-pending application Ser. No. 10/839,548 entitled "Method for a Hermetically Sealable Fill Valve", the entirety of which is incorporated herein by reference as if fully disclosed herein. Once filled with a low-density gas and fully sealed, the disk drive is ready for testing and use.

Figure 13:
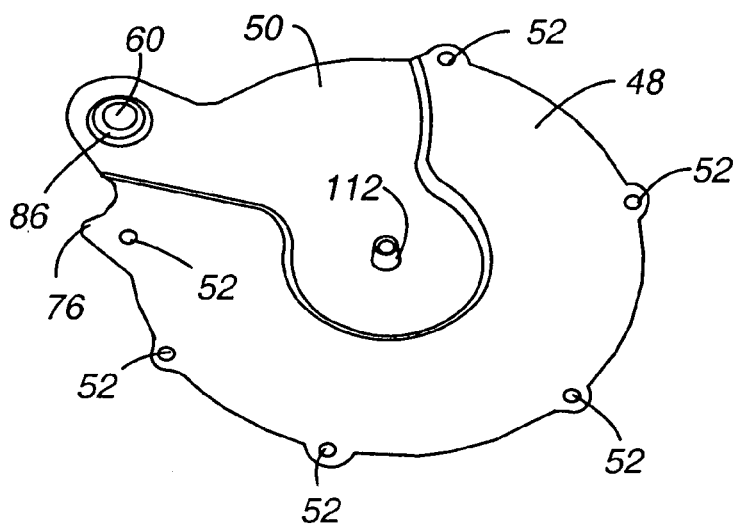
FIG. 13 is a perspective view of an alternative embodiment of the capture plate.
Figure 14:
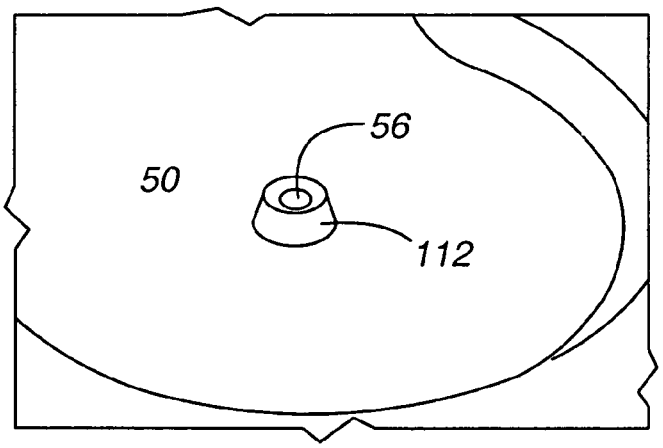
FIG. 14 is an enlarged view of the conical portion used to secure the capture plate to the spindle shaft of the embodiment illustrated in FIG. 13.

FIGS. 13 and 14 show alternative embodiments of the capture plate 46. In the embodiment of FIG. 13, the ledge 70 has been eliminated such that the capture plate is not secured to the upper voice coil plate 72. This has the effect of reducing cost and complexity if the additional structural support is not required. FIGS. 13 and 14 also illustrate a frustro conical-shaped bushing 112 extending from the interior surface proximate the aperture 56 to provide a more stable connection to the spindle shaft 28. The frustro conical bushing 112 is inserted to an opening in the spindle shaft 28 (not shown) to center and align the spindle shaft 28 and capture plate relative to each other, as well as to provide additional physical rigidity to the connection between the capture plate and the spindle shaft. As a further alternative, the bushing 112 may be secured to the spindle shaft without a fastener, but by a friction or snap-fit as would be appreciated by one of skill in the art upon review of this disclosure. A similar conical bushing may also be used in securing the capture plate to the actuator shaft 38.

Figure 15:
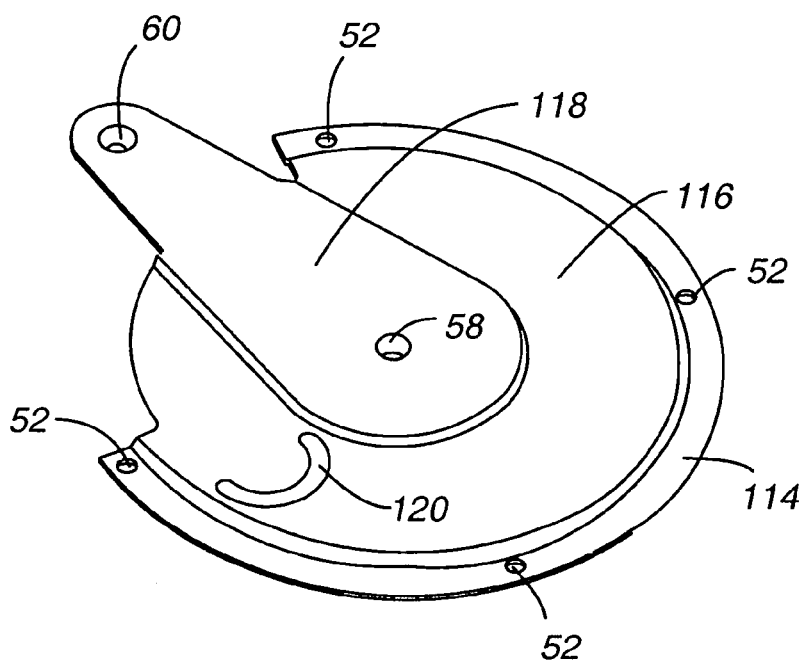
FIG. 15 is a perspective view of a further alternative embodiment, including a servo-writer access hole to facilitate the servo-track writer (STW) process prior to cover installation.

A further alternative embodiment is shown in FIG. 15. In this embodiment, there are three distinct planar portions. A first perimeter planar portion 114, which includes apertures 52 for securing the capture plate to the base plate, a second raised planar portion 116, and a third planar portion 118, which includes apertures 58 and 60, allowing the capture plate to be secured to the spindle shaft and actuator shaft, respectively. Those of skill in the art will appreciate that the capture plate may take on other configurations, with differently configured planar portions for reducing and/or damping vibrations.

Figure 16:
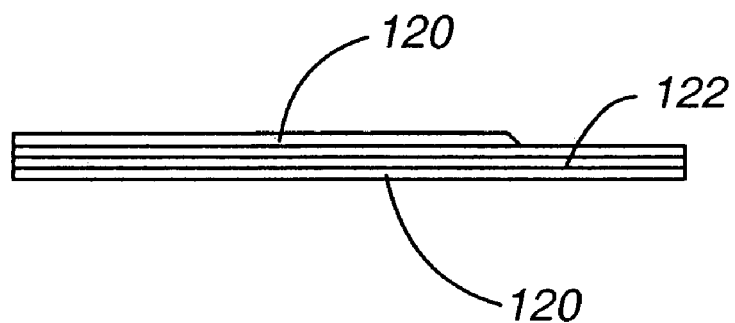
FIG. 16 is a side plan view of an alternative embodiment of the capture plate, illustrating a multi-layered configuration with an internal layer comprising a damping material.
Figure 17:
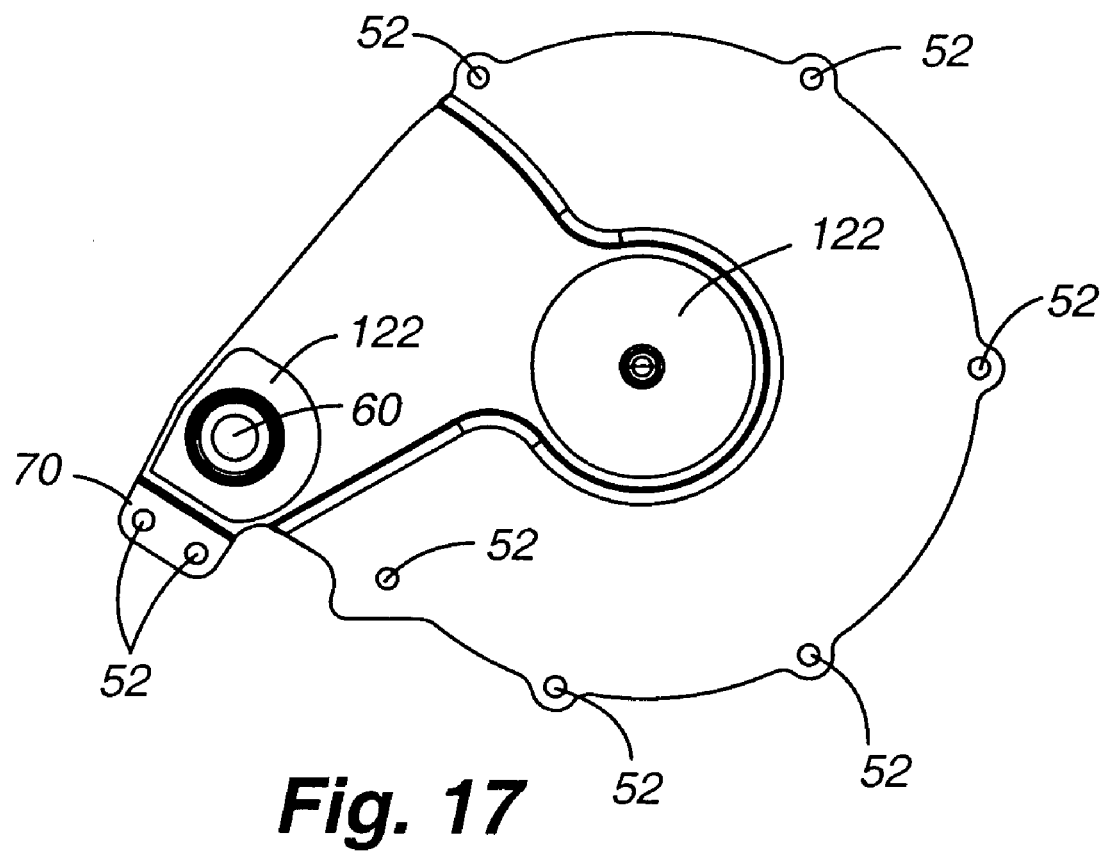
FIG. 17 is a bottom view of an alternative embodiment of the capture plate, illustrating damping material added at select locations.

One issue raised by utilization of the capture plate is, rather than securing the spindle shaft and actuator shaft to the cover plate, is the desire to maintain lateral or in-plane stiffness. With a relatively thin member, such as the capture plate, securing the spindle shaft and actuator shaft, rather than using the cover, vibration can be induced in the capture plate which, in turn, may cause movement of the spindle and actuator shafts. One manner of handling this issue is to form the capture plate of multiple members laminated together. FIG. 16 illustrates such a laminated structure. In one embodiment, the structure comprises two outer metal layers 120 and an inner layer 122 of damping material, such as 3M Scotch Damp Viscoelastic Damping Polymer, sample type 242F01-04. Another alternative is to add damping material at least to those areas where the spindle shaft and actuator shaft are attached to the capture plate. One example of this embodiment is shown in FIG. 17. A third alternative is to provide a capture plate with different planar portions to enhance in-plane stiffness of the capture plate. Examples of this are illustrated in FIGS. 8-15. A further alternative is to configure the capture plate such that the frequencies generated by the flexing of the capture plate (oil canning) are at a high enough level to permit the servo system of the disk drive to compensate. It is preferred that the capture plate be made from aluminum to match the thermal expansion of the other components of the disk drive and avoid creating problems from thermal expansion. In addition, the capture plate may also be provided with slot 120 to permit servo track writing with the capture plate secured to the base plate in position.

Maintaining a seal for the disk drive such that it may maintain the low density gas environment over an intended lifespan can further be enhanced by impregnating the cover and base plate castings. Such methods for the epoxy impregnation of the base and cover plates are discussed in co-pending application Ser. No. 10/839,608 entitled "Process to Seal Aluminum Die Castings to Contain Low Density Gas". The disclosure of this application is incorporated by reference in its entirety.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus comprising:
   a hermetically sealed housing which encloses an inert gas atmosphere, the housing comprising opposing first and second housing members;
   a member within the housing rotatable about a shaft; and
   a capture plate which extends between the first and second housing members, the capture plate supported by an interior wall projection of the first housing member to support a first end of the shaft adjacent the second housing member.

2. The apparatus of claim 1, further comprising a second member within the housing rotatable about a second shaft, wherein the capture plate further supports a first end of the second shaft adjacent the second housing member.

3. The apparatus of claim 1, wherein the capture plate is disposed between the rotatable member and the second housing member, and wherein the capture plate is substantially planar to form a fluidic gap between the capture plate and the second housing member.

4. The apparatus of claim 1, wherein the rotatable member is characterized as a rotatable disk.

5. The apparatus of claim 1, wherein the rotatable member is characterized as a rotatable actuator which positions a transducer adjacent a storage medium.

6. The apparatus of claim 1, wherein a second end of the shaft opposite the first member is supported by the first housing member.

7. The apparatus of claim 1, further comprising a plurality of spaced apart interior wall projections which extend from the first housing member and surround the rotatable member to support the capture plate.

8. The apparatus of claim 7, wherein the plurality of spaced part interior wall projections cooperate to form a continuously extending annular shroud wall adjacent an outermost periphery of the rotatable member.

9. The apparatus of claim 1, wherein the interior wall projection comprises an inwardly facing shroud surface adjacent the rotatable member.

10. The apparatus of claim 1, further comprising a first fastener within the housing which extends through an aperture of the capture plate to engage the first end of the shaft.

11. The apparatus of claim 10, further comprising a second fastener within the housing which extends through a second aperture adjacent a peripheral edge of the capture plate to engage the interior wall projection of the first housing member.

12. The apparatus of claim 1, wherein the rotatable member comprises a rotatable disk, wherein the capture plate comprises a first substantially planar portion which extends adjacent the rotatable disk, wherein the capture plate further supports a first end of a second shaft about which an actuator rotates, and wherein the capture plate further comprises a second substantially planar portion substantially parallel to and in non-planar relation with the first planar portion, the second planar portion extending adjacent the rotatable actuator.

13. The apparatus of claim 1, wherein the first housing member is characterized as a base deck, wherein the second housing member is characterized as cover, and wherein the housing further comprises a peripherally disposed seal member compressed between the base deck and the cover.

14. An apparatus comprising:
substantially planar first and second housing members which matingly engage to form a hermetically sealed housing which encloses an inert gas atmosphere;
a member within the housing rotatable about a shaft; and
a capture plate supported within the housing adjacent to and in non-contacting relation to the second housing member by an interior wall projection extending from the first housing member, the capture plate supporting a first end of the shaft adjacent the second housing member.

15. The apparatus of claim 14, further comprising a second member within the housing rotatable about a second shaft, wherein the capture plate further supports a first end of the second shaft adjacent the second housing member.

16. The apparatus of claim 14, wherein the capture plate is disposed between the rotatable member and the second housing member, and wherein the capture plate is substantially planar to form a fluidic gap between the capture plate and the second housing member.

17. The apparatus of claim 14, wherein the rotatable member is characterized as a rotatable disk.

18. The apparatus of claim 14, wherein the rotatable member is characterized as a rotatable actuator which positions a transducer adjacent a storage medium.

19. The apparatus of claim 14, wherein a second end of the shaft opposite the first member is supported adjacent the first housing member.

20. The apparatus of claim 14, further comprising a spindle motor supported by the first housing member which rotates the member about the shaft.

21. The apparatus of claim 14, further comprising a plurality of spaced apart interior wall projections which extend from the first housing member and surround the rotatable member to support the capture plate.

22. The apparatus of claim 21, wherein the plurality of spaced part interior wall projections cooperate to form a continuously extending annular shroud wall adjacent an outermost periphery of the rotatable member.

23. The apparatus of claim 14, further comprising a first fastener within the housing which extends through an aperture of the capture plate to engage the first end of the shaft.

24. The apparatus of claim 23, further comprising a second fastener within the housing which extends through a second aperture adjacent a peripheral edge of the capture plate to engage the interior wall projection of the first housing member.

25. The apparatus of claim 14, wherein the inert gas atmosphere is characterized as a helium atmosphere.

26. An apparatus comprising:
a hermetically sealed housing which encloses an inert gas atmosphere, the housing formed from opposing, substantially planar first and second housing members which compress a peripherally extending seal member, wherein an interior wall projection extends from a medial portion of the first housing member; and
a capture plate contactingly supported within the housing by the interior wall projection adjacent to and in a spaced apart relation with the second housing member, the capture plate supporting a shaft about which a rotatable member is configured for rotation within the housing.

27. The apparatus of claim 26, further comprising a second member within the housing rotatable about a second shaft supported by the capture plate adjacent the second housing member.

28. The apparatus of claim 26, wherein the capture plate is disposed between the rotatable member and the second housing member, and wherein the capture plate is substantially planar to form a fluidic gap between the capture plate and the second housing member.

29. The apparatus of claim 26, wherein the rotatable member is characterized as a rotatable disk and the cover plate is substantially disk shaped to abut the rotatable disk.

30. The apparatus of claim 26, wherein the rotatable member is characterized as a rotatable actuator which positions a transducer adjacent a storage medium.

31. The apparatus of claim 26, wherein a second end of the shaft opposite the first member is supported adjacent the first housing member.

32. The apparatus of claim 26, further comprising a plurality of spaced apart interior wall projections which extend from the first housing member and surround the rotatable member to support the capture plate.

33. The apparatus of claim 32, wherein the plurality of spaced part interior wall projections cooperate to form a continuously extending annular shroud wall adjacent an outermost periphery of the rotatable member.

34. The apparatus of claim 26, further comprising a first fastener within the housing which extends through an aperture of the capture plate to engage the first end of the shaft.

35. The apparatus of claim 34, further comprising a second fastener within the housing which extends through a second aperture adjacent a peripheral edge of the capture plate to engage the interior wall projection of the first housing member.

36. The apparatus of claim 26, wherein the first and second housing members and the capture plate are substantially parallel and extend in a substantially common direction, and wherein the interior wall portion extends in a direction substantially normal to the common direction.

37. The apparatus of claim 26, wherein at least a selected one of the first and second housing members has an exterior wall projection which extends along an outermost periphery of the selected member to contactingly engage the seal member.

* * * * *